United States Patent [19]

Tsuboyama et al.

[11] Patent Number: 4,712,875

[45] Date of Patent: Dec. 15, 1987

[54] DIMENSIONS OF SPACER PARTICLES FOR A FERROELECTRIC LIQUID CRYSTAL DISPLAY

[75] Inventors: Akira Tsuboyama, Tokyo; Kazuharu Katagiri, Tama; Junichiro Kanbe, Yokohama, all of Japan

[73] Assignee: Canon Kabushiki Kaisha, Tokyo, Japan

[21] Appl. No.: 862,979

[22] Filed: May 14, 1986

[30] Foreign Application Priority Data

May 15, 1985 [JP] Japan .................... 60-103074

[51] Int. Cl.⁴ .................................. G02F 1/133
[52] U.S. Cl. ............................ 350/344; 350/35 OS
[58] Field of Search ...................... 350/35 OS, 344

[56] References Cited

U.S. PATENT DOCUMENTS

| 3,742,600 | 7/1973 | Lowell | 350/344 |
| 4,362,771 | 12/1982 | Umeda et al. | 350/344 |
| 4,458,988 | 7/1984 | Pettersen | 350/344 |

FOREIGN PATENT DOCUMENTS

| 3400429 | 7/1985 | Fed. Rep. of Germany | 350/344 |
| 0132117 | 8/1982 | Japan | 350/344 |
| 0155828 | 9/1984 | Japan | 350/344 |
| 0115915 | 6/1985 | Japan | 350/35 OS |
| 0159727 | 8/1985 | Japan | 350/344 |
| 2102979 | 2/1983 | United Kingdom | 350/344 |

*Primary Examiner*—Stanley D. Miller
*Assistant Examiner*—David Lewis
*Attorney, Agent, or Firm*—Fitzpatrick, Cella, Harper & Scinto

[57] ABSTRACT

A liquid crystal device comprising a pair of base plates and a ferroelectric chiral smectic liquid crystal disposed between the base plates. The pair of base plates being secured to each other to leave a spacing which is small enough to release the spiral structure of the ferroelectric chiral smectic liquid crystal due to the wall effect of the base plates. Fibrous spacers having a diameter d ($\mu m$) and an average length l satisfying the relationship of $3 \leq l/d \leq 100$ are disposed together with the ferroelectric chiral smectic liquid crystal.

11 Claims, 7 Drawing Figures

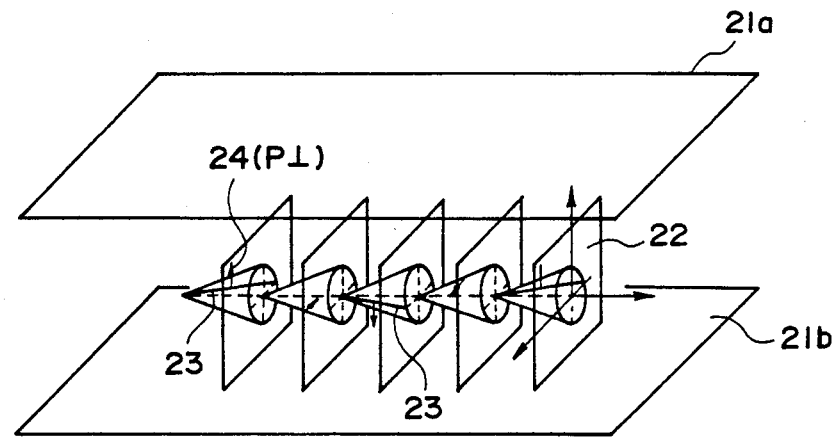
F I G. 1
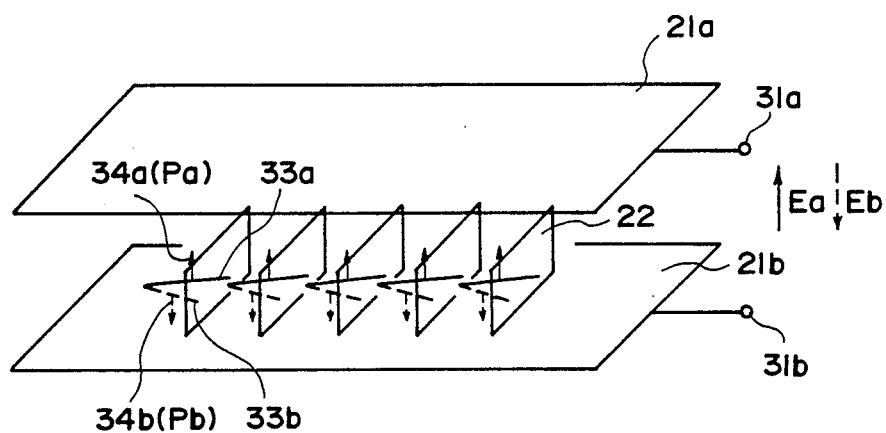
F I G. 2

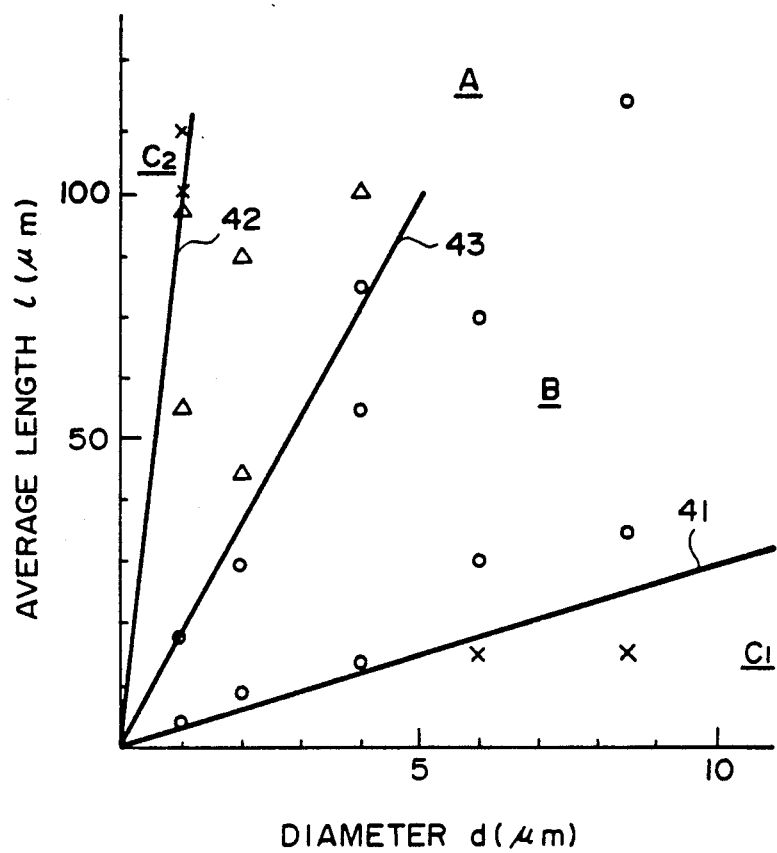
F I G. 4

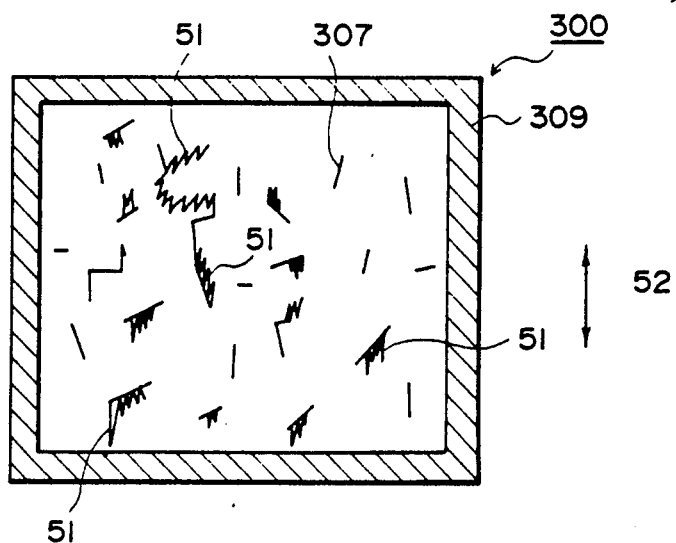
F I G. 5
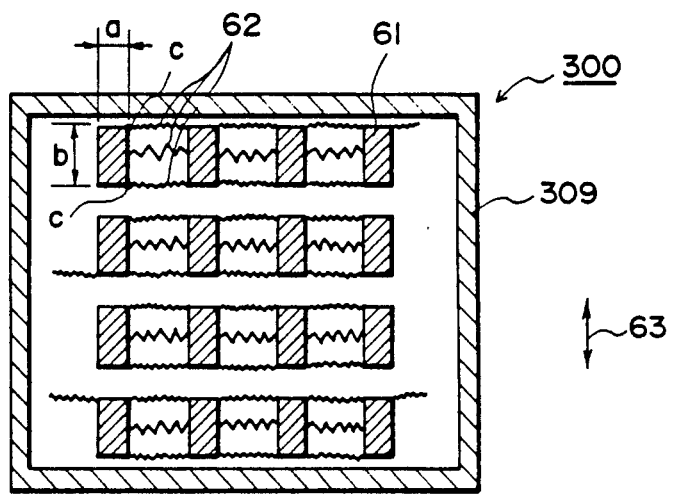
F I G. 6

DIMENSIONS OF SPACER PARTICLES FOR A FERROELECTRIC LIQUID CRYSTAL DISPLAY

FIELD OF THE INVENTION AND RELATED ART

The present invention relates to a liquid crystal device applied to a liquid crystal display device, a liquid crystal-optical shutter array, etc., and more particularly to a liquid crystal device having improved display and driving characteristics through improved initial orientation or alignment of liquid crystal molecules.

In the field of liquid crystal devices, there have been well known liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127-128. In this type of liquid crystal device, the number of picture elements have been restricted, because there is a problem that a crosstalk phenomenon occurs when a device of a matrix electrode structure with a high density of picture elements is driven according to a time-sharing or time-division driving scheme.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned draw-backs of the conventional types of liquid crystal devices, Clark and Lagerwall have proposed the use of a liquid crystal device having bistability (e.g., U.S. Pat. No. 4367924). As the liquid crystal showing bistability, a ferroelectric liquid crystal showing a chiral smectic C phase (SmC*) or H phase (SmH*) is generally used. The liquid crystal is formed in a layer having a thickness which is small enough to release or unwind the spiral structure of the ferroelectric liquid crystal because of the wall effect of the substrate. As a result, the ferroelectric liquid crystal is caused to have a bistability comprising a first optically stable state and a second optically stable state. Accordingly, different from the conventional TN-type liquid crystal in the above-mentioned device, the liquid crystal is oriented to the first stable state in response to one electric field vector and to the second stable state in response to the other electric field vector.

In order that a ferroelectric liquid crystal having bistability can realize desired driving characteristics, it is required that the liquid crystal disposed between a pair of parallel base plates has a molecular arrangement such that the molecules can effectively be switched between the two stable states.

However, with respect to such a chiral smectic liquid crystal device provided with a bistability through loosening or release of the helical structure as described above, there is a very difficult problem in production of the device. More specifically, while it is necessary to make thin the liquid crystal layer thickness corresponding to a spacing between a pair of base plates or substrates, there has been found a tendency that orientation defects increase as the liquid crystal layer thickness becomes smaller. Moreover, it has been found that such orientation defects are caused by the presence of spacer members which are disposed to provide a uniform thickness of liquid crystal layer over the entire area of the device.

SUMMARY OF THE INVENTION

An object of the present invention is, in view of the above-mentioned circumstances, to provide a ferroelectric liquid crystal device for use as a display device having a high response speed characteristic, a high density of picture elements and a large display area, or an optical shutter having a high shutter speed, wherein the ferroelectric liquid crystal device can fully exhibit its performances by improving the monodomain formation characteristic or the initial alignment characteristic which has been the principal problem of the device.

The present invention aims at providing a liquid crystal device showing good bistability and free of orientation or alignment defects over the whole area of the device in spite of the above mentioned spacers present in the ferroelectric liquid crystal. More specifically, the liquid crystal device according to the present invention is a liquid crystal device comprising a pair of base plates and a ferroelectric chiral smectic liquid crystal disposed between the base plates, wherein the pair of base plates are secured to each other to leave a spacing which is small enough to release the spiral structure of the ferroelectric chiral smectic liquid crystal due to the wall effect of the base plates, and fibrous spacers having a diameter d ($\mu$m) and an average length l satisfying the relationship of $3 \leq 1/d \leq 100$ are disposed together with the ferroelectric chiral smectic liquid crystal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal device using a chiral smectic liquid crystal;

FIG. 4 is an explanatory view showing relationships among a diameter (d) and an average length (l) of fiber, orientation state and bistability based on the results of an example; and FIGS. 5 and 6 show sketches of orientation defects occurred in comparative devices.

DETAILED DESCRIPTION OF PREFERRED EMBODIMENTS

Figure 3A:
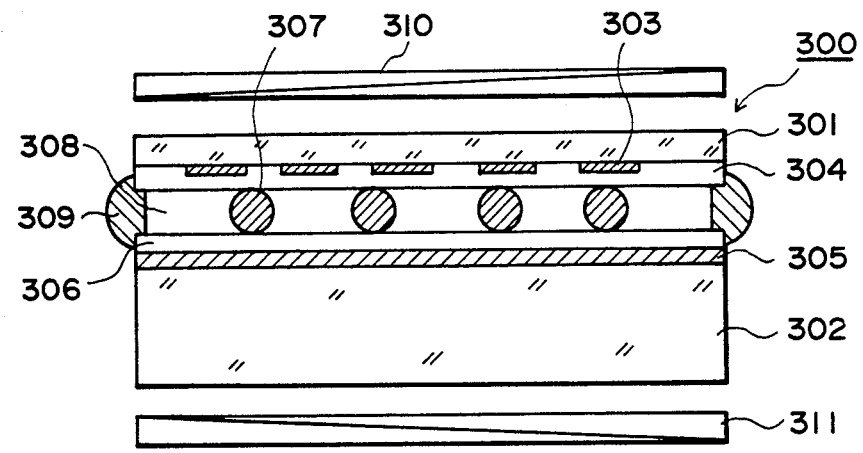
FIG. 3A is a sectional view of an embodiment of the liquid crystal device according to the present invention.

Referring to FIG. 1, there is schematically shown an example of a ferroelectric liquid crystal cell for explanation of the operation thereof. Reference numerals 21a and 21b denote base plates (glass plates) on which a transparent electrode of, e.g., $In_2O_3$, $SnO_2$, ITO (Indium-Tin Oxide), etc., is disposed respectively. A liquid crystal of a chiral smectic phase such as SmC* or SmH* in which liquid crystal molecular layers 22 are oriented perpendicular to surfaces of the glass plates is hermetically disposed therebetween. A full line 23 shows liquid crystal molecules. Each liquid crystal molecule 23 has a dipole moment (P⊥) 24 in a direction perpendicular to the axis thereof. When a voltage higher than a certain threshold level is applied between electrodes formed on the base plates 21a and 21b, a helical structure of the liquid crystal molecule 23 is loosened or unwound to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than 10 μ). As the thickness of the liquid crystal layer is decreased, the helical structure of the liquid crystal molecules is loosened even in the absence of an electric field whereby the dipole moment assumes either of the two states, i.e., Pa in an upper direction 34a or Pb in a lower direction 34b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented to either a first stable state 33a or a second stable state 33b.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state 33a. This state is kept stable even if the electric field is removed. On the other hand, when the electric field Ea of which direction is opposite to that of the electric field Ea is applied thereto, the liquid crystal molecules are oriented to the second stable state 33b, whereby the directions of molecules are changed. This state is similarly kept stable even if the electric field is removed. Further, as long as the magnitude of the electric field Ea or Eb being applied is not above a certain threshold value, the liquid crystal molecules are placed in the respective orientation states. In order to effectively realize the high response speed and bistability, it is preferable that the thickness of the cell is as thin as possible.

Figure 3B:
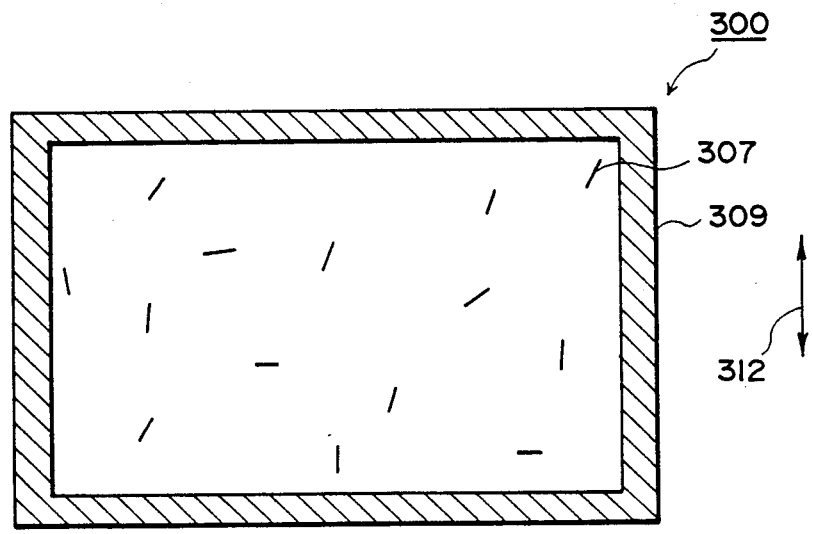
FIG. 3B is a plan view thereof.

FIGS. 3A and 3B more specifically show a liquid crystal device according to the present invention, wherein FIG. 3A is a sectional view and FIG. 3B is a plan view.

A liquid crystal device shown in FIGS. 3A and 3B comprises a base plate 301 (preferably of flexible glass or flexible plastic) and a base plate 302 (preferably, a glass plate). On the base plate 301 are successively disposed transparent electrodes 303 in the form of stripes and an orientation controlling film 304 of an insulating material applied as a coating thereon. On the other hand, on the base plate 302 are successively disposed transparent electrodes 305 crossing the transparent electrodes 303 at right angles and an orientation controlling film 306 of an insulating material applied as a coating thereon. Between the base plates 302 and 303 are disposed fibrous spacers 307 (of, e.g., glass fiber) along with a ferroelectric chiral smectic liquid crystal 308 of a non-spiral structure.

The fibrous spacers 307 used in the present invention have a cylindrical shape with a diameter d (μm) and an average length l (μm) satisfying the relationship of $3 \leq l/d \leq 100$ as described above, most preferably $3 \leq l/d \leq 20$. Herein the diameter d is preferably within the range of 0.5 to 5 μm. The length of individual fibers should preferably be 200 μm or shorter, particularly in the range of 10 to 100 μm. Particularly, if the latter condition of $3d \leq 1 \leq 20d$ is satisfied, occurrence of orientation or alignment defects can be completely avoided. This point will be described in further detail hereinafter.

In order to effectively prevent the occurrence of orientation defects, the fibrous spacer members should preferably be dispersed at a rate of 0.1 to 100 per mm² of the area of the liquid crystal device 300. Especially, if the dispersion rate is in the range of 0.5 to 50 per mm² of the device area, occurrence of orientation defects can be completely obviated in a bistable monodomain formed with a liquid crystal layer disposed within a sufficiently thin spacing (0.5 - 5 μm) between the base plates 301 and 302.

The fibrous spacers 307 may be dispersed on at least one of the two base plates by spraying a dispersion of the spacers in a volatile liquid such as fluoromethane, fluoroethane, isopropyl alcohol, and methanol onto at least one base plate, or by dipping at least one base plate in the above mentioned dispersion of the spacers.

The ferroelectric chiral smectic liquid crystal 308 is sealed with a sealing member 309 of, e.g., an epoxy adhesive, disposed at the peripheries of the base plates 301 and 302.

The liquid crystal device 300 according to the present invention is further provided with polarizers 310 and 311 disposed outside the base plates 301 and 302, respectively, in the form of cross nicols.

Orientation controlling films 304 and 306 used in the liquid crystal device 300 according to the present invention may be formed as a film of a compound such as silicon monoxide, silicon dioxide, aluminum oxide, titanium oxide, zirconia, magnesium fluoride, cerium oxide, cerium fluoride, silicon nitride, silicon carbide, and boron nitride, formed by, e.g., vapor deposition. Alternatively, they may be formed as a coating film of resins such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, and acrylic resin. The thickness of the orientation controlling films 304 and 306 may be set within the range of ordinarily 50 Å to 5 μ, preferably 500 Å to 5000 Å.

The orientation controlling films 304 and 306 may have an effect or function of orienting the molecular axial or alignment direction of a uniaxial liquid crystal (one appearing in smectic A phase, nematic phase, etc., appearing at a higher temperature than the ferroelectric chiral smectic liquid crystal phase) in one direction. A specific uniaxial orientation treatment adopted for this purpose may be the rubbing method which comprises rubbing a base plate face in one direction or the oblique vapor deposition method. In FIG. 3B, the rubbing direction is expressed by a two-headed arrow 312.

The ferroelectric chiral smectic liquid crystal 308 used in the liquid crystal device 300 according to the present invention may preferably be one causing phase transition of isotropic phase (Iso)→cholesteric phase (Ch)→smectic A phase (SmA) →chiral smectic phase or one causing phase transition of isotropic phase→SmA→chiral smectic phase, respectively, on gradual cooling at a rate of, e.g., 0.5° C./hr to 5° C./hr.

Hereinbelow, the present invention will be explained more specifically by way of examples.

EXAMPLE

A glass substrate provided with stripe electrodes of ITO (indium-tin-oxide) was dipped in a polyimide-forming solution ("PIQ" produced by Hitachi Kasei Kogyo K.K.) adjusted to a non-volatile content of 6.0 wt.%, and after being pulled up, subjected to curing by heating at 120° C. for 30 min., at 200° C. for 60 min., and at 350° C. for 30 min., whereby a 1000 Å-thick insulating film was formed. The surface was rubbed with velvet in one direction in parallel with the extension of the stripe electrodes.

Then, the thus treated glass substrate was dipped in a dispersion of 40 mg of glass fiber in 400 cc of methanol and pulled up.

The above procedure was repeated by using glass fiber with variety of dimensions as shown in the following Table 1.

TABLE 1

| Glass fiber sample | Diameter d ($\mu$m) | Average length l ($\mu$m) |
|---|---|---|
| (1) | 1 | 5 |
| (2) | 1 | 20 |
| (3) | 1 | 55 |
| (4) | 1 | 95 |
| (5) | 1 | 100 |
| (6) | 1 | 110 |
| (7) | 2 | 10 |
| (8) | 2 | 30 |
| (9) | 2 | 45 |
| (10) | 2 | 90 |
| (11) | 4 | 15 |
| (12) | 4 | 55 |
| (13) | 4 | 75 |
| (14) | 4 | 100 |
| (15) | 6 | 15 |
| (16) | 6 | 30 |
| (17) | 6 | 70 |
| (18) | 8.5 | 15 |
| (19) | 8.5 | 35 |
| (20) | 8.5 | 115 |

Separately, a glass substrate provided with stripe electrodes and an insulating layer disposed thereon was prepared in the same manner as described above, and the coating face was rubbed with velvet in one direction perpendicular to the extension of the stripe electrodes. An epoxy adhesive was applied by a screen printing method at the periphery of this glass substrate except for a portion forming an injection port.

One of the thus treated glass substrates was applied to one of the above prepared glass substrates on which the glass fiber had been dispersed so that their stripe electrodes mutually crossed at right angles and their rubbing directions were in parallel with each other, and the epoxy adhesive was cured under the prescribed curing conditions to prepare a cell (blank cell).

Separately, a liquid crystal material having a composition and showing a phase transition characteristic as shown below was prepared.

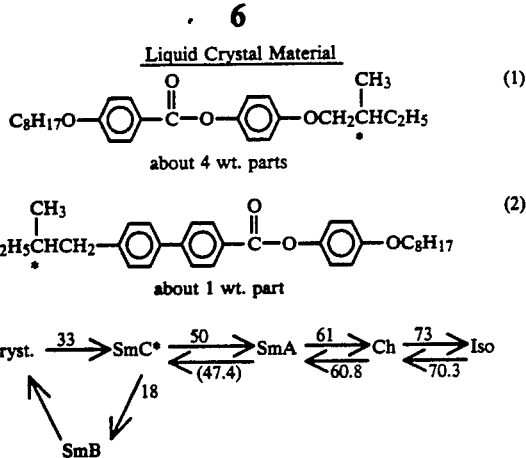

Subsequently, the above prepared blank cell was placed in a vacuum vessel to be sufficiently evacuated, and the injection port thereof was disposed in contact with the above mentioned liquid crystal material placed under isotropic phase (at about 75° C.) so that the cell interior was isolated from the exterior. Then, the pressure in the vacuum vessel was returned to an atmospheric level, whereby the liquid crystal material was injected into the cell. Then, the injection port was sealed, and the liquid crystal material in the isotropic phase was subjected to gradual cooling at a rate of about 0.5° C./hr, thereby to undergo successive phase transition of from the isotropic phase, through cholesteric phase and smectic A phase into chiral smectic C phase. As a result, ferroelectric chiral smectic liquid crystal device (memory type device) was prepared at 28° C.

The orientation or alignment state of the liquid crystal device was observed through a polarizing microscope arranged in cross nicols. Further, the bistability of the liquid crystal device was evaluated by applying voltages of 30 volts and $-30$ volts. The results of these experiments, repeated by using various dimensions of fiber as shown in Table 1 above, are summarized in FIG. 4. In FIG. 4, a symbol o denotes a sample device which showed a good orientation state where no orientation defects were observed at all and showed a good bistability; $\Delta$ denotes a sample device which provided some orientation defects but showed a practically acceptable level of bistability; and x denotes a sample device which provided a large number of orientation defects as shown in FIG. 5 by way of a sketch and was impossible for practical use. In FIG. 5, the same reference numerals as in FIG. 3 denote the same members.

In view of FIG. 4, there are sample devices denoted by o and $\Delta$ in a region A contained by a line 41 corresponding to l=3d and a line 42 corresponding to l=100d, whereas sample devices denoted by x are present in region $C_2$ outside the region A. In the region $C_2$, if a fiber axis is oriented substantially along the rubbing direction 52, defects do not occur frequently. However, if the fiber axis has a component which is vertical to the rubbing direction and which is long, a rate of defects becomes high. FIG. 4 especially shows that sample devices denoted by only o are present in a region contained by the line 41 and a line 43 corresponding to l=20d and they are all good devices in respect of both orientation state and bistability.

Further, in sample devices falling within a region $C_1$ corresponding to l<3d, there occurred local ununiformity in cell thickness, whereby bistability could not be realized uniformly over the whole area of the liquid crystal devices. It may be possible to consider that this was caused by sticking of the lengthwise portion of fiber in the insulating film used as an orientation controlling film.

By the way, a liquid crystal device was prepared in the same manner as in the above examples except that coating pattern spacers 61 as shown in FIG. 6 were used in place of the glass fiber spacers. More specifically, the spacers 61 were formed as polyimide spacers having a width (a) of 0.5 mm and a length (b) of 1 mm through the steps of applying a solution of SP-510 (a polyimide precursor, available from Toray K.K.) in N-methylpyrrolidone so as to form a film of 1.5 μm in dry thickness onto an insulating layer formed by the PIQ on a glass substrate and carrying out photo-etching of the SP-510 film. The surface of the glass substrate provided with the polyimide spacers were rubbed with velvet in a direction 63.

The thus prepared liquid crystal device was observed through a polarizing microscope arranged in cross nicols, whereby there were observed many orientation defects as shown in FIG. 6 by way of a sketch and good bistability was not obtained, so that the device was unacceptable for practical use as an optical shutter.

In view of FIG. 6, it is assumed that the orientation defects were caused by the presence of sides a which were vertical to the rubbing direction 63 in the course of formation of oriented liquid crystal arrangement in the gradual cooling stage, and especially intersections c of sides a and sides b provided defect sources. While the mechanism of occurrence of defects has not been clarified as yet, it may be attributable to the tendency of liquid crystal molecules aligning in parallel with spacer walls when a specific liquid crystal phase (SmA phase in this example) is formed in a gradual cooling stage.

Such a phenomenon has not been observed in a nematic liquid crystal or cholesteric liquid crystal but is characteristically observed in a chiral smectic liquid crystal especially when it is formed in a cell which is thin enough to release or unwind the spiral structure. In this embodiment, it has become clear as a tendency that the rate of occurrence of defects is decreased as the sides a become shorter or the cell thickness becomes larger.

What is claimed is:

1. In a liquid crystal device comprising a pair of base plates and a ferroelectric chiral smectic liquid crystal disposed between the base plates, said pair of base plates being secured to each other to leave a spacing which is small enough to release the spiral structure of the ferroelectric chiral smectic liquid crystal due to the wall effect of the base plates; the improvement wherein fibrous spacers having a diameter d (μm) and an average length l satisfying the relationship of $3 \leq l/d \leq 100$, are disposed together with the ferroelectric chiral smectic liquid crystal.

2. A liquid crystal device according to claim 1, wherein said wall effect comprises an effect of orienting uniaxial liquid crystal molecules in one direction.

3. A liquid crystal device according to claim 2, wherein said effect of orienting uniaxial liquid crystal molecules in one direction has been obtained by rubbing the face of a base plate.

4. A liquid crystal device according to claim 1, wherein said fibrous spacers are distributed at a rate of 0.1 to 100 per $mm^2$.

5. A liquid crystal device according to claim 1, wherein said fibrous spacers are distributed at a rate of 0.5 to 50 per $mm^2$.

6. A liquid crystal device according to claim 1, wherein the diameter d and the average length l of said fibrous spacers satisfy the relationship of $3 \leq l/d \leq 20$.

7. A liquid crystal device according to claim 1, wherein said fibrous spacers comprise glass fiber.

8. A liquid crystal device according to claim 1, wherein said chiral smectic liquid crystal is a liquid crystal showing a successive phase transition of isotropic phase, cholesteric phase, and smectic A phase in the course of temperature decrease from a temperature higher than that giving the chiral smectic phase.

9. A liquid crystal device according to claim 1, wherein at least one of said pair of base plates is provided with an orientation controlling film.

10. A liquid crystal device according to claim 9, wherein said orientation controlling film comprises a film of silicon monoxide, silicon dioxide, aluminum oxide, titanium oxide, zirconia, magnesium fluoride, cerium oxide, cerium fluoride, silicon nitride, silicon carbide, or boron nitride.

11. A liquid crystal device according to claim 9, wherein said orientation controlling film comprises a film of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin and acrylic resin.

* * * * *